(12) United States Patent
Bowden et al.

(10) Patent No.: US 12,442,315 B2
(45) Date of Patent: Oct. 14, 2025

(54) GAS TURBINE ENGINE

(71) Applicant: General Electric Company, Schenectady, NY (US)

(72) Inventors: William Joseph Bowden, Cleves, OH (US); Keith Edward James Blodgett, Milford, OH (US)

(73) Assignee: General Electric Company, Evendale, OH (US)

(*) Notice: Subject to any disclaimer, the term of this patent is extended or adjusted under 35 U.S.C. 154(b) by 0 days.

(21) Appl. No.: 17/889,927

(22) Filed: Aug. 17, 2022

(65) Prior Publication Data

US 2024/0060430 A1 Feb. 22, 2024

(51) Int. Cl.
*F01D 25/24* (2006.01)
*F01D 25/28* (2006.01)

(52) U.S. Cl.
CPC .............. *F01D 25/24* (2013.01); *F01D 25/28* (2013.01); *F05D 2220/323* (2013.01); *F05D 2240/14* (2013.01); *F05D 2250/38* (2013.01); *F05D 2250/72* (2013.01); *F05D 2260/30* (2013.01)

(58) Field of Classification Search
CPC .... F01D 25/28; F01D 25/24; F05D 2220/323; F05D 2240/14; F05D 2250/38; F05D 2250/72; F05D 2260/30; B64D 29/00; B64D 29/02; B64D 29/06; B64C 7/02; B64C 17/889; B64C 17/927; F02K 3/06

See application file for complete search history.

(56) References Cited

U.S. PATENT DOCUMENTS

| 3,134,561 | A |   | 5/1964  | Clejan     |                  |
|-----------|---|---|---------|------------|------------------|
| 3,721,389 | A | * | 3/1973  | MacKinnon  | F02K 1/1207      |
|           |   |   |         |            | 239/265.19       |
| 3,765,623 | A | * | 10/1973 | Donelson   | B64D 33/02       |
|           |   |   |         |            | 137/15.1         |
| 3,806,067 | A | * | 4/1974  | Kutney     | F02K 1/78        |
|           |   |   |         |            | 60/797           |

(Continued)

FOREIGN PATENT DOCUMENTS

EP 2159403 A2 * 3/2010 ............. B64D 33/04

OTHER PUBLICATIONS

Airbus, A400M, Delivery to the Point of Need, Jul. 26, 2021, 8 Pages. Retrieved from: http://web.archive.org/web/20210812110334/ https://www.airbus.com/defence/a400m.html.

(Continued)

*Primary Examiner* — Nathaniel E Wiehe
*Assistant Examiner* — Wayne A Lambert
(74) *Attorney, Agent, or Firm* — Dority & Manning, P.A.

(57) ABSTRACT

A gas turbine engine defining a radial direction, an axial direction, a circumferential direction, and a longitudinal axis is provided. The gas turbine engine includes: a fan rotatable about the longitudinal axis; a turbomachine; and a housing surrounding the turbomachine and having an upper outer surface portion and a lower outer surface portion, the housing defining a first distance extending radially from the longitudinal axis to a first point located at the upper outer surface portion, the housing further defining a second distance extending radially from the longitudinal axis to a second point located at the lower outer surface portion, and the second distance is greater than the first distance.

20 Claims, 5 Drawing Sheets

(56) References Cited

U.S. PATENT DOCUMENTS

| | | | | |
|---|---|---|---|---|
| 4,314,681 A * | 2/1982 | Kutney | B64D 29/02 244/54 |
| 4,410,150 A * | 10/1983 | Lahti | F02K 1/52 239/265.19 |
| 4,446,696 A * | 5/1984 | Sargisson | F02K 3/077 60/226.3 |
| 4,447,022 A * | 5/1984 | Lion | B64D 33/06 244/45 R |
| 4,449,683 A * | 5/1984 | Gratzer | B64D 29/02 244/54 |
| 4,486,146 A * | 12/1984 | Campion | B64C 11/48 416/129 |
| 4,489,905 A * | 12/1984 | Bengelink | B64C 23/06 244/199.1 |
| 4,637,573 A * | 1/1987 | Perin | B64D 29/02 244/54 |
| 4,815,680 A * | 3/1989 | Goldhammer | B64C 7/02 244/55 |
| 4,867,394 A * | 9/1989 | Patterson, Jr. | B64D 27/18 244/54 |
| 4,953,812 A * | 9/1990 | Van der Hoeven | B64D 27/14 244/119 |
| 4,976,102 A * | 12/1990 | Taylor | F02C 7/20 416/129 |
| 5,058,379 A * | 10/1991 | Lardellier | F02K 3/077 60/268 |
| 5,065,959 A | 11/1991 | Bhatia et al. | |
| 5,369,954 A * | 12/1994 | Stuart | F02K 1/52 239/265.17 |
| 5,402,638 A | 4/1995 | Johnson | |
| 5,443,230 A * | 8/1995 | Lord | B64C 7/02 244/54 |
| 5,490,644 A * | 2/1996 | Koncsek | B64D 29/00 244/209 |
| 5,653,406 A * | 8/1997 | Amano | B64D 29/02 244/54 |
| 6,017,186 A | 1/2000 | Hoeger et al. | |
| 6,102,328 A * | 8/2000 | Kumata | B64D 27/18 244/45 R |
| 6,938,854 B2 | 9/2005 | Nelson | |
| 7,165,744 B2 * | 1/2007 | Howarth | B64D 33/04 244/55 |
| 8,006,931 B2 * | 8/2011 | Dantin | B64D 29/02 244/54 |
| 8,439,305 B2 * | 5/2013 | Marley | F02K 3/02 244/55 |
| 9,057,286 B2 * | 6/2015 | Murphy | B64D 29/02 |
| 9,102,397 B2 | 8/2015 | Wood | |
| 9,464,526 B2 | 10/2016 | Cellier et al. | |
| 9,567,090 B2 | 2/2017 | Gallet et al. | |
| 9,810,178 B2 * | 11/2017 | Dindar | F01D 25/30 |
| 9,879,540 B2 | 1/2018 | Li et al. | |
| 10,087,885 B2 | 10/2018 | Kohlenberg et al. | |
| 10,179,653 B2 * | 1/2019 | Gukeisen | B64D 27/40 |
| 10,330,047 B2 * | 6/2019 | Lord | F02K 3/06 |
| 10,399,664 B2 | 9/2019 | Bowden et al. | |
| 10,556,699 B2 | 2/2020 | Pautis et al. | |
| 10,723,434 B2 | 7/2020 | Gruber et al. | |
| 10,737,796 B2 | 8/2020 | Gruber et al. | |
| 11,408,306 B2 * | 8/2022 | Tejero Embuena | B64D 29/02 |
| 2008/0053061 A1 * | 3/2008 | McCall | F02K 3/06 60/226.1 |
| 2016/0167798 A1 * | 6/2016 | Prentice | B64D 27/40 244/54 |
| 2021/0108575 A1 | 4/2021 | Adibhatla et al. | |
| 2021/0277802 A1 * | 9/2021 | Dudekula | F02K 3/06 |
| 2023/0021836 A1 * | 1/2023 | Riddle | B64C 11/00 |
| 2023/0085244 A1 * | 3/2023 | Miller | B64C 11/48 415/68 |

OTHER PUBLICATIONS

Ibanez et al., Case Study of the Installation of the A400M Engine Control Unit, 8$^{th}$ European Conference for Aeronautics and Space Sciences (EUCASS), 2019, 10 Pages.

* cited by examiner

GAS TURBINE ENGINE

FIELD

The present disclosure relates to a gas turbine engine, and more specifically to a gas turbine engine having a nacelle.

BACKGROUND

A gas turbine engine typically includes a fan and a turbomachine. The turbomachine generally includes a nacelle in which an inlet, one or more compressors, a combustor, and one or more turbines are disposed. The one or more compressors compress air which is then channeled to the combustor where it is mixed with fuel. The mixture is then ignited for generating hot combustion gases. The combustion gases are channeled to the one or more turbines which extract energy from the combustion gases for powering the one or more compressors, as well as for producing useful work to propel an aircraft in flight. The turbomachine is mechanically coupled to the fan for driving the fan during operation.

BRIEF DESCRIPTION OF THE DRAWINGS

A full and enabling disclosure of the present disclosure, including the best mode thereof, directed to one of ordinary skill in the art, is set forth in the specification, which makes reference to the appended figures, in which.

DETAILED DESCRIPTION

Figure 1:
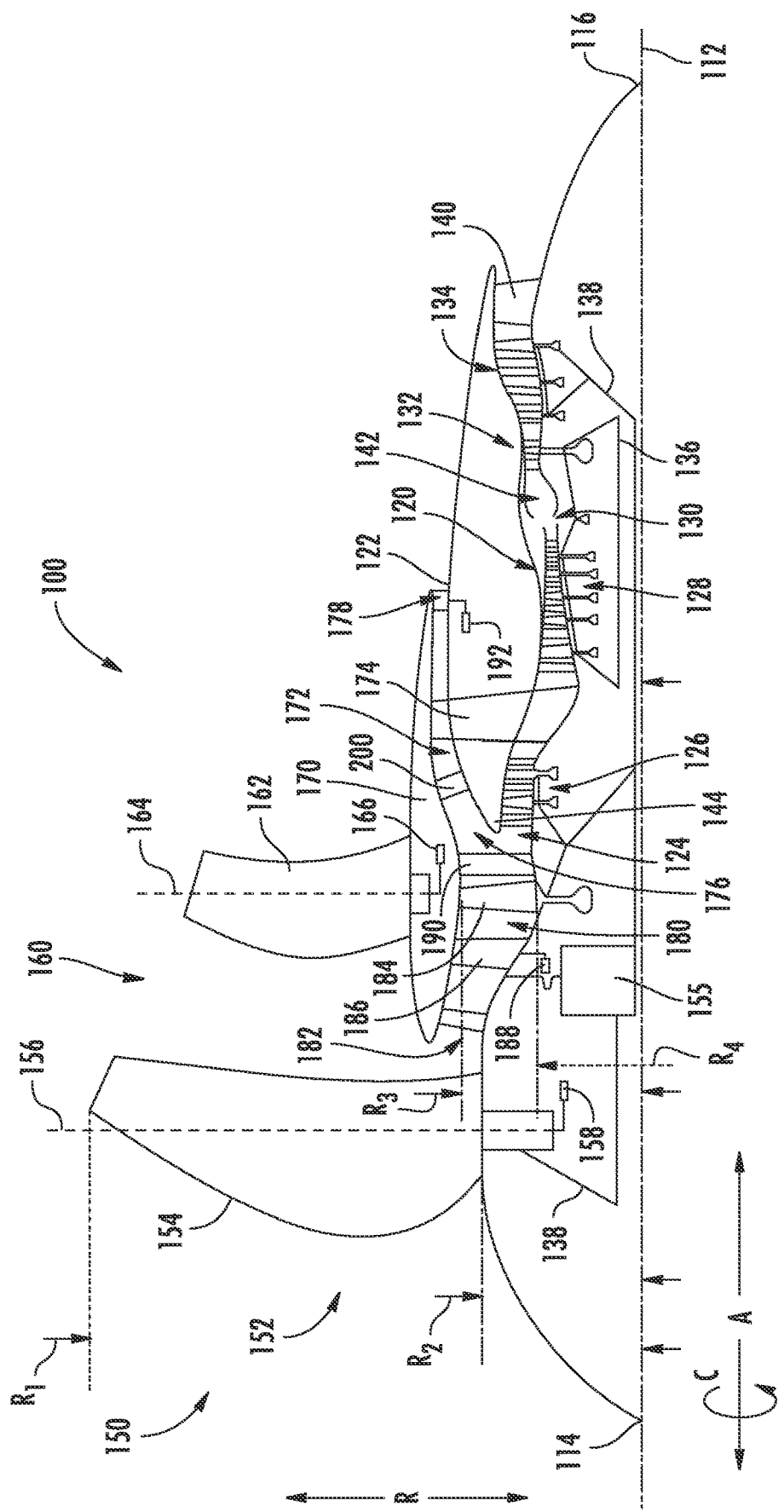
FIG. 1 is a schematic cross-sectional side view of a gas turbine engine in accordance with one or more embodiments of the present disclosure.

Reference will now be made in detail to present embodiments of the disclosure, one or more examples of which are illustrated in the accompanying drawings. The detailed description uses numerical and letter designations to refer to features in the drawings. Like or similar designations in the drawings and description have been used to refer to like or similar parts of the disclosure.

The word "exemplary" is used herein to mean "serving as an example, instance, or illustration." Any implementation described herein as "exemplary" is not necessarily to be construed as preferred or advantageous over other implementations. Additionally, unless specifically identified otherwise, all embodiments described herein should be considered exemplary.

The singular forms "a", "an", and "the" include plural references unless the context clearly dictates otherwise.

The term "at least one of" in the context of, e.g., "at least one of A, B, and C" refers to only A, only B, only C, or any combination of A, B, and C.

The term "turbomachine" refers to a machine including one or more compressors, a heat generating section (e.g., a combustion section), and one or more turbines that together generate a torque output.

The term "gas turbine engine" refers to an engine having a turbomachine as all or a portion of its power source. Example gas turbine engines include turbofan engines, turboprop engines, turbojet engines, turboshaft engines, etc., as well as hybrid-electric versions of one or more of these engines.

The term "combustion section" refers to any heat addition system for a turbomachine. For example, the term combustion section may refer to a section including one or more of a deflagrative combustion assembly, a rotating detonation combustion assembly, a pulse detonation combustion assembly, or other appropriate heat addition assembly. In certain example embodiments, the combustion section may include an annular combustor, a can combustor, a cannular combustor, a trapped vortex combustor (TVC), or other appropriate combustion system, or combinations thereof.

The terms "low" and "high", or their respective comparative degrees (e.g., -er, where applicable), when used with a compressor, a turbine, a shaft, or spool components, etc., each refer to relative speeds within an engine unless otherwise specified. For example, a "low speed turbine" defines a component configured to operate at a rotational speed, such as a maximum allowable rotational speed, lower than a "high speed turbine" of the engine.

The terms "forward" and "aft" refer to relative positions within a gas turbine engine or vehicle and refer to the normal operational attitude of the gas turbine engine or vehicle. For example, with respect to a gas turbine engine, forward refers to a position closer to an engine inlet and aft refers to a position closer to an engine nozzle or exhaust.

The terms "upstream" and "downstream" refer to the relative direction with respect to fluid flow in a fluid pathway. For example, "upstream" refers to the direction from which the fluid flows, and "downstream" refers to the direction to which the fluid flows.

As used herein, the terms "axial" and "axially" refer to directions and orientations that extend substantially parallel to a centerline of the gas turbine engine. Moreover, the terms "radial" and "radially" refer to directions and orientations that extend substantially perpendicular to the centerline of the gas turbine engine. In addition, as used herein, the terms "circumferential" and "circumferentially" refer to directions and orientations that extend arcuately about the centerline of the gas turbine engine.

Here and throughout the specification and claims, range limitations are combined and interchanged, such ranges are identified and include all the sub-ranges contained therein unless context or language indicates otherwise. For example, all ranges disclosed herein are inclusive of the endpoints, and the endpoints are independently combinable with each other.

A "third stream" as used herein means a non-primary air stream capable of increasing fluid energy to produce a minority of total propulsion system thrust. The third stream may generally receive inlet air (air from a ducted passage downstream of a primary fan) instead of freestream air (as the primary fan would). A pressure ratio of the third stream may be higher than that of the primary propulsion stream (e.g., a bypass or propeller driven propulsion stream). The thrust may be produced through a dedicated nozzle or through mixing of an airflow through the third stream with a primary propulsion stream or a core air stream, e.g., into a common nozzle.

In certain exemplary embodiments an operating temperature of the airflow through the third stream may be less than a maximum compressor discharge temperature for the engine, and more specifically may be less than 350 degrees Fahrenheit (such as less than 300 degrees Fahrenheit, such as less than 250 degrees Fahrenheit, such as less than 200 degrees Fahrenheit, and at least as great as an ambient temperature). In certain exemplary embodiments these operating temperatures may facilitate heat transfer to or from the airflow through the third stream and a separate fluid stream. Further, in certain exemplary embodiments, the airflow through the third stream may contribute less than 50% of the total engine thrust (and at least, e.g., 2% of the total engine thrust) at a takeoff condition, or more particularly while operating at a rated takeoff power at sea level, static flight speed, 86 degree Fahrenheit ambient temperature operating conditions.

Furthermore in certain exemplary embodiments, aspects of the airflow through the third stream (e.g., airstream, mixing, or exhaust properties), and thereby the aforementioned exemplary percent contribution to total thrust, may passively adjust during engine operation or be modified purposefully through use of engine control features (such as fuel flow, electric machine power, variable stators, variable inlet guide vanes, valves, variable exhaust geometry, or fluidic features) to adjust or optimize overall system performance across a broad range of potential operating conditions.

Generally, a gas turbine engine is attached to a wing of an aircraft via a pylon fairing. The space between the wing and the gas turbine engine adjacent to the pylon fairing is referred to as a gully area. Airflow through the gully area is a three-sided channel that passes over a lower surface of the wing, a side surface of the pylon fairing, and an upper surface of the gas turbine engine. The limited space of the gully area causes the airflow to accelerate, and the lower surface of the wing, the side surface of the pylon fairing, and the upper surface of the gas turbine engine create drag on the airflow, also known as scrubbing. The drag is typically worse on an inboard side of the pylon fairing.

The inventor of the present disclosure discovered that, while the drag can be an issue for ducted fans in which the airflow through the gully area is freestream flow, the drag is worse for open fan structures due to the airflow being supercharged through the unducted fan prior to passing through the gully area. The airflow pressurized by the unducted fan may be accelerated by a throat of the gully area, i.e., a section with a minimum area, then may further accelerate at the expanding flow area downstream of the throat. The unducted fan increases the Mach number of the airflow passing through the gully area, which may result in higher drag at the lower surface of the wing, the side surface of the pylon fairing, and the upper surface of the gas turbine engine. Supersonic flow and/or excessive drag can form in the gully area. The higher Mach number of the airflow through the gully area can result in a strong shock and a wave drag penalty that decreases efficiency. The inventors recognized that increasing the radial distance between the lower surface of the wing and the upper surface of the gas turbine engine would increase the area at the throat, reducing the acceleration at the throat of the gully area, in turn reducing the Mach number of the airflow through the gully area. This may result in reduced drag at the lower surface of the wing, the side surface of the pylon fairing, and the upper surface of the gas turbine engine, reduce the shock at the gully area, and improve efficiency of the aircraft.

Referring now to the drawings, wherein identical numerals indicate the same elements throughout the figures, FIG. 1 shows a schematic cross-sectional side view of a gas turbine engine 100 according to one or more embodiments of the present disclosure. Particularly, FIG. 1 provides an engine having a rotor assembly with a single stage of unducted rotor blades. In such a manner, the rotor assembly may be referred to herein as an "unducted fan," or the entire gas turbine engine 100 may be referred to as an "unducted engine." In addition, the engine of FIG. 1 includes a third stream extending from the compressor section to a rotor assembly flowpath over the turbomachine, as will be explained in more detail below.

Figure 2:
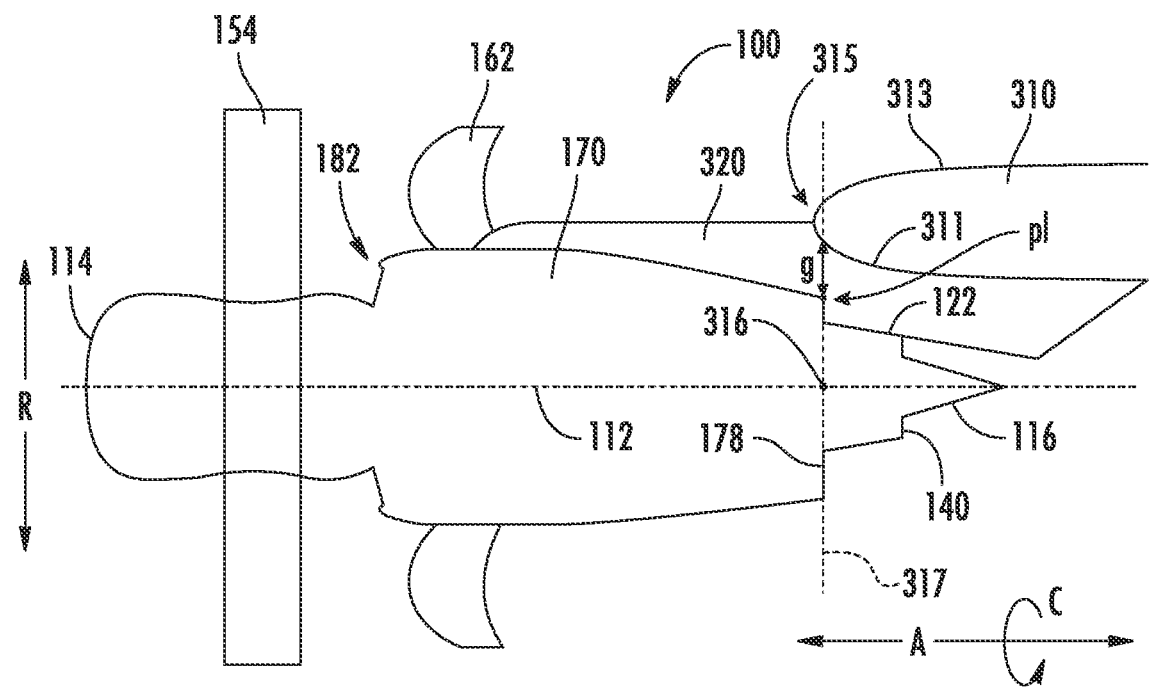
FIG. 2 is a schematic side view of a gas turbine engine attached to a wing in accordance with one or more embodiments of the present disclosure.

For reference, the gas turbine engine 100 defines an axial direction A, a radial direction R, and a circumferential direction C. In the below explanation, radial direction R is defined as a vertical direction of the installed gas turbine engine 100 on a wing 310 (FIG. 2). Moreover, the gas turbine engine 100 defines an axial centerline or longitudinal axis 112 that extends along the axial direction A. In general, the axial direction A extends parallel to the longitudinal axis 112, the radial direction R extends outward from and inward to the longitudinal axis 112 in a direction orthogonal to the axial direction A, and the circumferential direction extends three hundred sixty degrees (360°) around the longitudinal axis 112. The gas turbine engine 100 extends between a forward end 114 and an aft end 116, e.g., along the axial direction A.

The gas turbine engine 100 includes a turbomachine 120 and a rotor assembly, also referred to a fan section 150, positioned upstream thereof. Generally, the turbomachine 120 includes, in serial flow order, a compressor section, a combustion section, a turbine section, and an exhaust section. For example, as shown in FIG. 1, the turbomachine 120 includes a core cowl 122 that defines an annular core inlet 124. The core cowl 122 further encloses at least in part a low pressure system and a high pressure system. For example, the core cowl 122 depicted encloses and supports at least in part a booster or low pressure ("LP") compressor 126 for pressurizing the air that enters the turbomachine 120 through core inlet 124. A high pressure ("HP"), multi-stage, axial-flow compressor 128 receives pressurized air from the LP compressor 126 and further increases the pressure of the air. The pressurized air stream flows downstream to a combustor 130 of the combustion section where fuel is injected into the pressurized air stream and ignited to raise the temperature and energy level of the pressurized air.

It will be appreciated that as used herein, the terms "high/low speed" and "high/low pressure" are used with respect to the high pressure/high speed system and low pressure/low speed system interchangeably. Further, it will be appreciated that the terms "high" and "low" are used in this same context to distinguish the two systems, and are not meant to imply any absolute speed and/or pressure values.

The high energy combustion products flow from the combustor 130 downstream to a high pressure turbine 132. The high pressure turbine 132 drives the high pressure compressor 128 through a high pressure shaft 136. In this respect, the high pressure turbine 132 is drivingly coupled with the high pressure compressor 128. The high energy combustion products then flow to a low pressure turbine 134. The low pressure turbine 134 drives the low pressure compressor 126 and components of the fan section 150 through a low pressure shaft 138. In this respect, the low pressure turbine 134 is drivingly coupled with the low pressure compressor 126 and components of the fan section 150. According to one or more embodiments, the LP shaft 138 is coaxial with the HP shaft 136. After driving each of the turbines 132, 134, the combustion products exit the turbomachine 120 through a turbomachine exhaust nozzle 140.

Accordingly, the turbomachine 120 defines a working gas flowpath or core duct 142 that extends between the core inlet 124 and the turbomachine exhaust nozzle 140. The core duct 142 is an annular duct positioned generally inward of the core cowl 122 along the radial direction R. The core duct 142 (e.g., the working gas flowpath through the turbomachine 120) may be referred to as a second stream.

The fan section 150 includes a fan 152, which is the primary fan according to one or more embodiments. In the embodiments shown in FIG. 1, the fan 152 is an open rotor or unducted fan 152. As depicted, the fan 152 includes an array of fan blades 154 (only one shown in FIG. 1). The fan blades 154 are rotatable, e.g., about the longitudinal axis 112. As noted above, the fan 152 is drivingly coupled with the low pressure turbine 134 via the LP shaft 138. For the embodiments shown in FIG. 1, the fan 152 is coupled with the LP shaft 138 via a speed reduction gearbox 155, e.g., in an indirect-drive or geared-drive configuration.

Moreover, the fan blades 154 can be arranged in equal spacing around the longitudinal axis 112. Each blade 154 has a root and a tip and a span defined therebetween. Further, each fan blade 154 defines a fan blade tip radius R1 along the radial direction R from the longitudinal axis 112 to the tip, and a hub radius (or inner radius) R2 along the radial direction R from the longitudinal axis 112 to the base.

Moreover, each blade 154 defines a central blade axis 156. In one or more embodiments, each blade 154 of the fan 152 is rotatable about their respective central blades axes 156, e.g., in unison with one another. One or more actuators 158 are provided to facilitate such rotation and therefore may be used to change a pitch of the blades 154 about their respective central blades axes 156.

The fan section 150 further includes a fan guide vane array 160 that includes fan guide vanes 162 (only one shown in FIG. 1) disposed around the longitudinal axis 112. In the embodiments shown in FIG. 1, the fan guide vanes 162 are not rotatable about the longitudinal axis 112. Each fan guide vane 162 has a root and a tip and a span defined therebetween. The fan guide vanes 162 may be unshrouded as shown in FIG. 1 or, alternatively, may be shrouded, e.g., by an annular shroud spaced outward from the tips of the fan guide vanes 162 along the radial direction R or attached to the fan guide vanes 162.

Each fan guide vane 162 defines a central blade axis 164. For the embodiments shown in FIG. 1, each fan guide vane 162 of the fan guide vane array 160 is rotatable about their respective central blades axes 164, e.g., in unison with one another. One or more actuators 166 are provided to facilitate such rotation and therefore may be used to change a pitch of the fan guide vane 162 about their respective central blades axes 164. However, in other embodiments, each fan guide vane 162 may be fixed or unable to be pitched about its central blade axis 164. The fan guide vanes 162 are mounted to a nacelle 170.

As shown in FIG. 1, in addition to the fan 152, which is unducted, a ducted fan 184 may be included aft of the fan 152, such that the gas turbine engine 100 includes both a ducted and an unducted fan which both serve to generate thrust through the movement of air without passage through at least a portion of the turbomachine 120 (e.g., without passage through the HP compressor 128 and combustion section for the embodiment depicted). The ducted fan is rotatable at about the same axis as the fan blade 154. The ducted fan 184 is, for the embodiments depicted, driven by the low pressure turbine 134 (e.g. coupled to the LP shaft 138). In the embodiments depicted, as noted above, the fan 152 may be referred to as the primary fan, and the ducted fan 184 may be referred to as a secondary fan. It will be appreciated that these terms "primary" and "secondary" are terms of convenience, and do not imply any particular importance, power, or the like.

The ducted fan 184 includes a plurality of fan blades (not separately labeled in FIG. 1). The fan blades of the ducted fan 184 may be arranged in equal spacing around the longitudinal axis 112. Each blade of the ducted fan 184 has a root and a tip and a span defined therebetween. Further, each fan blade of the ducted fan 184 defines a fan blade tip radius R3 along the radial direction R from the longitudinal axis 112 to the tip, and a hub radius (or inner radius) R4 along the radial direction R from the longitudinal axis 112 to the base.

The nacelle 170 annularly encases at least a portion of the core cowl 122 and is generally positioned outward of at least a portion of the core cowl 122 along the radial direction R. Particularly, a downstream section of the nacelle 170 extends over a forward portion of the core cowl 122 to define a fan flowpath or fan duct 172. According to one or more embodiments, the fan flowpath or fan duct 172 may be understood as forming at least a portion of the third stream of the gas turbine engine 100.

Incoming air may enter through the fan duct 172 through a fan duct inlet 176 and may exit through a fan exhaust nozzle 178 to produce propulsive thrust. The fan duct 172 is an annular duct positioned generally outward of the core duct 142 along the radial direction R. The nacelle 170 and the core cowl 122 are connected together and supported by a plurality of substantially radially-extending, circumferentially-spaced stationary struts 174 (only one shown in FIG. 1). The stationary struts 174 may each be aerodynamically contoured to direct air flowing thereby. Other struts in addition to the stationary struts 174 may be used to connect and support the nacelle 170 and/or core cowl 122. In one or more embodiments, the fan duct 172 and the core duct 142 may at least partially co-extend (generally axially) on opposite sides (e.g., opposite radial sides) of the core cowl 122. For example, the fan duct 172 and the core duct 142 may each extend directly from the leading edge 144 of the core cowl 122 and may partially co-extend generally axially on opposite radial sides of the core cowl.

The gas turbine engine 100 also defines or includes an inlet duct 180. The inlet duct 180 extends between an engine inlet 182 and the core inlet 124/fan duct inlet 176. The engine inlet 182 is defined generally at the forward end of the nacelle 170 and is positioned between the fan 152 and the fan guide vane array 160 along the axial direction A. The inlet duct 180 is an annular duct that is positioned inward of the nacelle 170 along the radial direction R. Air flowing downstream along the inlet duct 180 is split, not necessarily evenly, into the core duct 142 and the fan duct 172 by a splitter or leading edge 144 of the core cowl 122. The inlet duct 180 is wider than the core duct 142 along the radial direction R. The inlet duct 180 is also wider than the fan duct 172 along the radial direction R.

The exemplary gas turbine engine 100 depicted further includes an array of inlet guide vanes 186 positioned in the inlet duct 180 upstream of the ducted fan 184 and downstream of the engine inlet 182. The array of inlet guide vanes 186 are arranged around the longitudinal axis 112. In the embodiment depicted, the inlet guide vanes 186 are not rotatable about the longitudinal axis 112. Each inlet guide vanes 186 defines a central blade axis (not labeled), and is rotatable about their respective central blade axes, e.g., in unison with one another. One or more actuators 188 are provided to facilitate such rotation and therefore may be used to change a pitch of the inlet guide vanes 186 about their respective central blades axes. However, in other embodiments, each inlet guide vanes 186 may be fixed or unable to be pitched about its central blade axis.

Further, located downstream of the ducted fan 184 and upstream of the fan duct inlet 176, the gas turbine engine 100 may include an array of outlet guide vanes 190. As with the array of inlet guide vanes 186, the array of outlet guide vanes 190 may not be rotatable about the longitudinal axis 112. However, for the embodiment depicted, unlike the array of inlet guide vanes 186, the array of outlet guide vanes 190 may be configured as fixed-pitch outlet guide vanes.

Further, in the embodiment depicted, the fan exhaust nozzle 178 of the fan duct 172 is further configured as a variable geometry exhaust nozzle. In such a manner, the gas turbine engine 100 includes one or more actuators 192 for modulating the variable geometry exhaust nozzle. For example, the variable geometry exhaust nozzle may be configured to vary a total cross-sectional area (e.g., an area of the nozzle in a plane perpendicular to the longitudinal axis 112) to modulate an amount of thrust generated based on one or more engine operating conditions (e.g., temperature, pressure, mass flowrate, etc. of an airflow through the fan duct 172). A fixed geometry exhaust nozzle may also be adopted.

The combination of the array of inlet guide vanes 186 located upstream of the ducted fan 184, the array of outlet guide vanes 190 located downstream of the ducted fan 184, and the fan exhaust nozzle 178 may result in a more efficient generation of third stream thrust during one or more engine operating conditions. Further, by introducing a variability in the geometry of the inlet guide vanes 186 and the fan exhaust nozzle 178, the gas turbine engine 100 may be capable of generating more efficient third stream thrust across a relatively wide array of engine operating conditions, including takeoff and climb (where a maximum total engine thrust may be desirable) as well as cruise (where a lesser amount of total engine thrust may be desirable).

Referring still to FIG. 1, in one or more embodiments, air passing through the fan duct 172 may be relatively cooler (e.g., lower temperature) than one or more fluids utilized in the turbomachine 120. In this way, one or more heat exchangers 200 may be positioned in thermal communication with the fan duct 172. For example, one or more heat exchangers 200 may be disposed within the fan duct 172 and utilized to cool one or more fluids from the turbomachine with the air passing through the fan duct 172, as a resource for removing heat from a fluid, e.g., compressor bleed air, oil or fuel.

Although not depicted, the heat exchanger 200 may be an annular heat exchanger extending substantially 360 degrees in the fan duct 172 (e.g., at least 300 degrees, such as at least 330 degrees). In such a manner, the heat exchanger 200 may effectively utilize the air passing through the fan duct 172 to cool one or more systems of the gas turbine engine 100 (e.g., lubrication oil systems, compressor bleed air, electrical components, etc.). The heat exchanger 200 uses the air passing through duct 172 as a heat sink and correspondingly increases the temperature of the air downstream of the heat exchanger 200 and exiting the fan exhaust nozzle 178.

Figure 3:
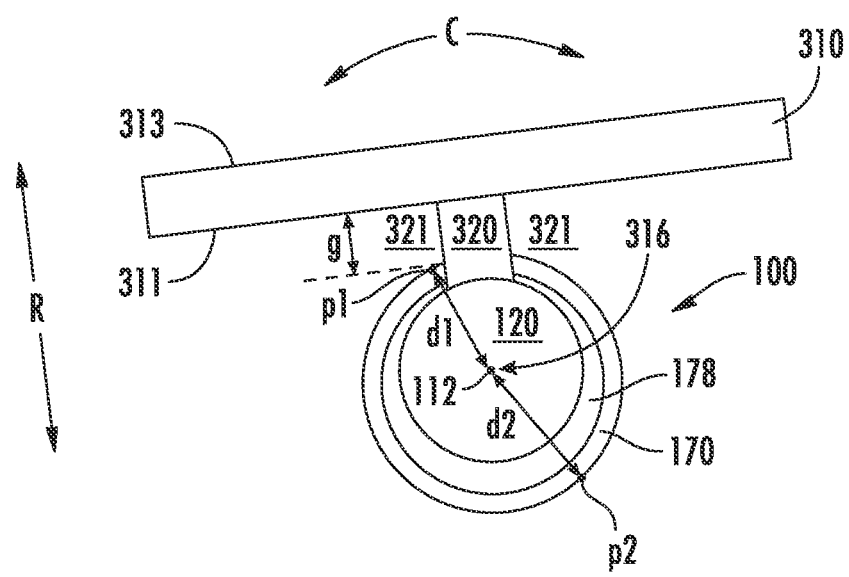
FIG. 3 is a schematic cross-sectional aft view of a gas turbine engine attached to a wing according to one or more embodiments of the present disclosure.

FIG. 2 is a schematic side view of an aircraft in accordance with one or more embodiments of the present disclosure, and FIG. 3 is a schematic view of the gas turbine engine 100 attached to the wing 310 shown in FIG. 2 in a reference plane perpendicular to an axial direction A/longitudinal axis 112 and including a gully distance g. As shown in FIG. 2, the gas turbine engine 100 extends from a forward end 114 to an aft end 116 in the axial direction A. The gas turbine engine 100 includes an array of fan blades 154 disposed around the longitudinal axis 112, which are described in detail above with reference to FIG. 1. As shown in FIG. 2, the gas turbine 100 further includes fan guide vanes 162 disposed on a nacelle (or housing) 170 of the gas turbine engine 100 around the longitudinal axis 112, which are also described in detail above with reference to FIG. 1. As shown in FIG. 2, an engine inlet 182 is positioned between fan blades 154 and the fan guide vanes 162, at a forward end of the nacelle 170 in the axial direction A. A fan exhaust nozzle 178 is positioned at an aft end of the nacelle 170 in the axial direction A. In the embodiment depicted, the fan exhaust nozzle 178 is formed annularly around the longitudinal axis 112 between an inner surface of the nacelle 170 and an outer surface of the core cowl 122. As explained above with respect to FIG. 1, the fan exhaust nozzle 178 is an exhaust for the fan duct 172 that may form at least a portion of the third stream of the gas turbine engine 100. Further, a turbomachine exhaust nozzle 140 is positioned at an aft end of core cowl 122 in the axial direction A.

The wing 310 defines a lower surface 311 on a lower side of the wing 310 with respect to the radial direction R of the gas turbine engine 100, and an upper surface 313 on an upper side of the wing 310 with respect to the radial direction R of the gas turbine engine 100. As shown in FIG. 2, the wing 310 further defines a leading edge 315 on a forward side of the wing 310 (the leading edge 315 is positioned at a stagnation point when the aircraft including the wing 310 is operated in a cruise operating condition) with respect to the axial direction A of the gas turbine engine 100 and the wing 310 further defines a trailing edge (not shown) on an aft side of the wing 310 with respect to the axial direction A of the gas turbine engine 100. The gas turbine engine 100 is attached to the wing 310 via a pylon fairing 320. In the embodiment depicted, the pylon fairing 320 extends between the lower surface 311 of the wing 310, the leading edge 315 of the wing 310, or both to an upper surface of the gas turbine engine 100. More specifically, for the embodiment depicted, the pylon fairing 320 is attached to an upper surface of the nacelle 170, the core cowl 122, or both. Although not shown, according to one or more embodiments, the pylon fairing 320 may extend to the aft end 116 of the gas turbine engine 100.

It will be appreciated, however, that the configuration depicted in FIG. 2 is by way of example only. In other exemplary embodiments of the present disclosure, the pylon fairing 320 may be oriented in any suitable manner relative to the wing 210 and/or the gas turbine engine 100. For example, in certain exemplary embodiments, the pylon fairing 320 may be oriented perpendicularly to the wing 210, may be oriented perpendicularly to a plane parallel to the ground when installed, etc.

As shown in FIG. 2, the gully distance g is formed between the wing 310 and the gas turbine engine 100, and more specifically for the embodiment show is defined as the minimum distance between the wing 310 and the gas turbine engine 100. More specifically, still, for the embodiment depicted the gully distance g is the minimum distance between the gas turbine engine 100, as measured from the lower surface 311 of the wing 310 (e.g., a surface below the leading edge 315) to a first point p1 on an upper surface of the nacelle 170 directly adjacent to the pylon fairing 320 with respect to the circumferential direction C of the gas turbine engine 100. The gully distance g is defined within a reference plane 317, the reference plane 317 extending perpendicular to the axial direction A and positioned at an axial position 316.

At the corresponding axial position 316 of the gully distance g, the gas turbine engine 100 defines a first distance d1 that is a distance from the longitudinal axis 112 to an upper outer surface portion of the nacelle 170 (i.e., an upper half of the outer surface of the nacelle 170 in a normal operational attitude), and more specifically to a first point p1 on an outermost surface of the gas turbine engine 100 on an upper side of the gas turbine engine 100 at a position directly axially adjacent to the pylon fairing 320, as shown in FIG. 3. At the axial position 316 of the gully distance g, the gas turbine engine 100 further defines a second distance d2 that is a distance from the longitudinal axis 112 to a lower outer surface portion of the nacelle 170 (i.e., a lower half of the outer surface of the nacelle 170 in a normal operational attitude), and more specifically to a second point p2 on an outermost surface of the gas turbine engine 100 on a lower side of the gas turbine engine 100, as shown in FIG. 3. The first point p1, the longitudinal axis 112, and the second point p2 are colinear (i.e., a straight line passes through all three). As shown in FIG. 3, at the axial position 316 of the gully distance g, the distance measured radially from the longitudinal axis 112 to the outer surface of the gas turbine engine 100 is maximum at the lowermost portion of the gas turbine engine 100, and continually decreases in the upper direction until the minimum is reached at the uppermost portion of the gas turbine engine 100, adjacent to the pylon fairing 320.

As shown in FIG. 3, gully areas 321 are formed between the wing 310 and the gas turbine engine 100 adjacent to the pylon fairing 320. The fan exhaust nozzle 178, which may be an exit of a third stream flowpath according to one or more embodiments, narrows from a lower end of the gas turbine engine 100 in the radial direction R to an upper end of the gas turbine engine 100 in the radial direction R, such that the upper portion of the fan exhaust nozzle 178 is significantly narrower than the lower portion of the fan exhaust nozzle 178. As a result, the first distance d1 is less than the second distance d2.

Conventional turbofan engines extend symmetrically around a longitudinal axis. That is, for any given position in an axial direction, the outer surface of a conventional gas turbine engine is disposed at an equal distance in the radial direction from the longitudinal axis. As explained above, the first distance d1 is less than the second distance d2. For a given gully distance g between the longitudinal axis 112 and the lower surface 311 of the wing 310, decreasing the first distance d1 results in an increase in the gully distance g. Thus, it will be appreciated that, by structuring the gas turbine engine such that the first distance d1 is less than the second distance d2, the gully distance g is increased compared with a conventional gas turbine engine in which the radius of the outer surface is annularly constant.

Figure 4:
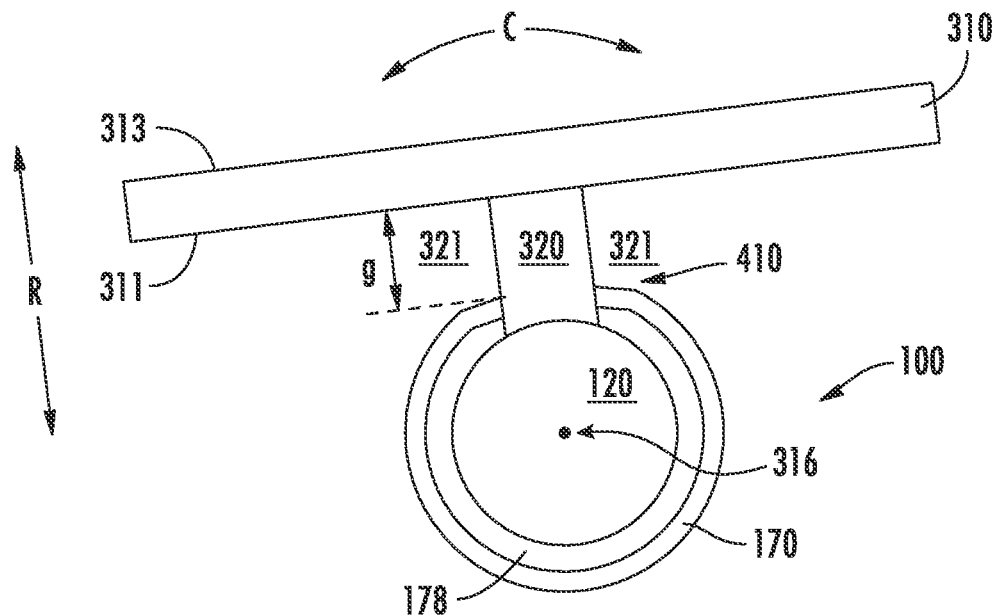
FIG. 4 is a schematic cross-sectional aft view of a gas turbine engine attached to a wing according to one or more embodiments of the present disclosure.
Figure 5:
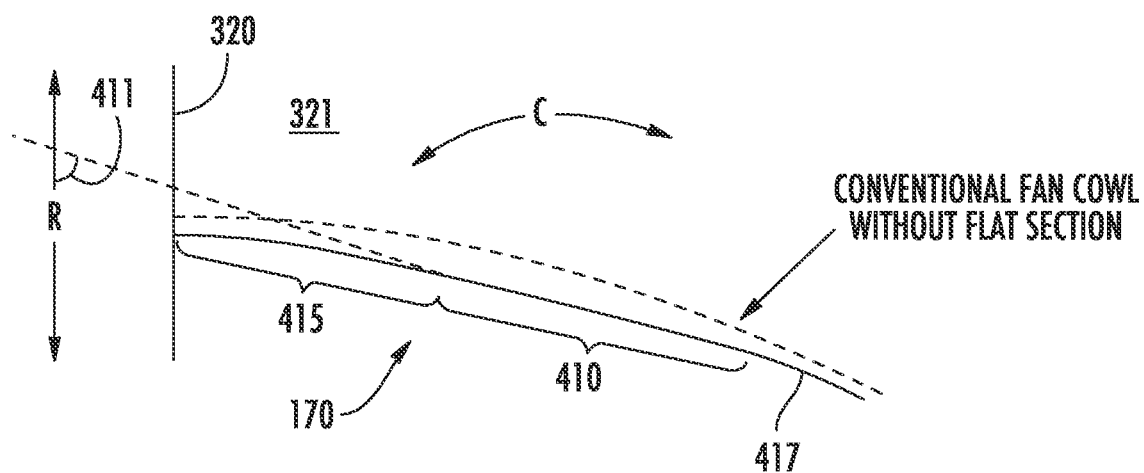
FIG. 5 is an explanatory view of a flat section of the fan nacelle to the right of the pylon fairing in FIG. 4 compared with a conventional fan nacelle.

FIG. 4 is a schematic cross-sectional aft view of a gas turbine engine 100 attached to a wing 310 according to one or more embodiments of the present disclosure, and FIG. 5 is an explanatory view of a flat section 410 of the fan nacelle to the right of the pylon fairing 320 in FIG. 4 compared with a conventional fan nacelle. Specifically, FIG. 4 shows a cross-sectional view of the gas turbine engine 100 attached to the wing 310 at a reference plane 317 at an axial position 316 in which a gully distance g is defined, similar to the reference plane 317 and axial position 316 of FIG. 2. Description of the portions similar to FIG. 3 will be omitted.

The gas turbine engine 100 shown in FIG. 4 includes a flat section 410 at an upper portion of the gas turbine engine 100 near the pylon fairing 320. In the embodiment depicted, the nacelle 170 includes symmetrical sections 417 (FIG. 5) that are annularly symmetrical around the gas turbine engine 100, with the fan exhaust nozzle 178 correspondingly annularly symmetrical within the symmetrical sections 417 of the nacelle 170. Additionally, the nacelle 170 further includes curved sections 415 (FIG. 5) immediately adjacent to the pylon fairing 320. The nacelle 170 further includes, between the curved sections 415 and the symmetrical section 417, flat sections 410 (FIG. 5) that are substantially flat.

The flat sections 410 allow for the upper surface of the nacelle 170 to be farther away from the lower surface 311 of the wing 310 compared to a gas turbine engine without a flat section, as shown in FIG. 5. Therefore, the nacelle 170 having the flat section 410 results in an increase in the gully distance g between the gas turbine engine 100 and the lower surface 311 compared to the conventional nacelle. While FIG. 5 shows embodiments in which the flat section 410 extends from a curved section 415 that extends from the pylon fairing 320, in alternate embodiments, the flat section 410 may extend directly from the pylon fairing 320 to the symmetrical section 417. Furthermore, while FIG. 5 shows embodiments in which the flat section 410 extends to the symmetrical section 417, in alternate embodiments, a transition section may be disposed between the flat section 410 and the symmetrical section 417.

Figure 6:
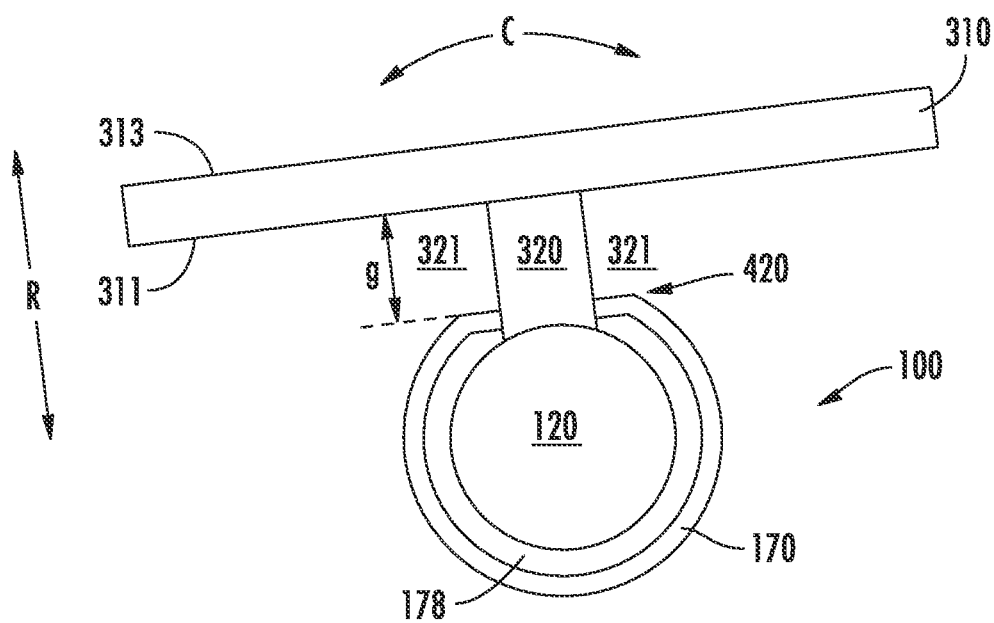
FIG. 6 is a schematic cross-sectional aft view of a gas turbine engine attached to a wing according to one or more embodiments of the present disclosure.

FIG. 6 is a schematic cross-sectional aft view of a gas turbine engine 100 attached to a wing 310 according to one or more embodiments of the present disclosure. The embodiment shown in FIG. 6 is similar to FIG. 5, and the description of the portions similar to FIG. 5 will be omitted. While the flat sections 410 of the gas turbine engine 100 shown in FIG. 5 are at an angle with respect to the lower surface 311 of the wing 310 (and in particular, the flat sections 410 each define an acute angle 411 with the radial direction R; see FIG. 5), in the embodiment shown in FIG. 6, the gas turbine engine 100 includes a flat portion 420 that is substantially parallel to the lower surface 311 of the wing 310, which further increases the gully distance g between the gas turbine engine 100 and the lower surface 311 of the wing 310.

Figure 7:
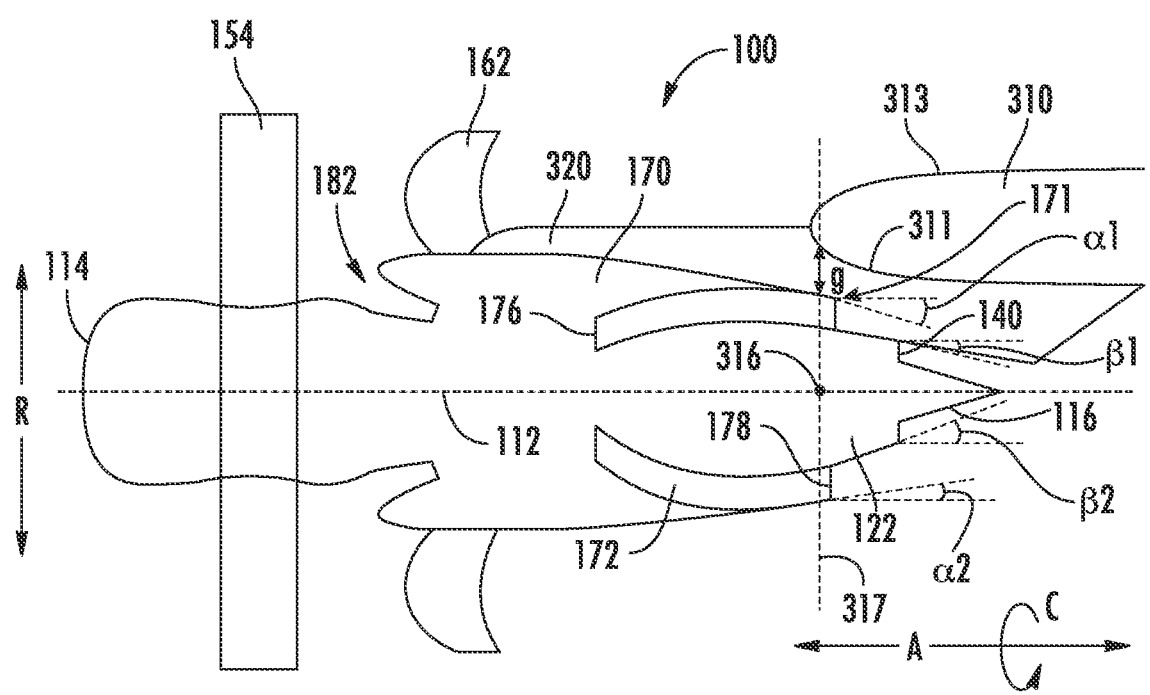
FIG. 7 is a schematic side view of a gas turbine engine attached to a wing in accordance with one or more embodiments of the present disclosure.

FIG. 7 is a schematic side view of a gas turbine engine 100 attached to a wing 310 in accordance with one or more embodiments of the present disclosure. The embodiment shown in FIG. 7 is similar to FIG. 2, and description of the portions similar to FIG. 2 will be omitted. The gas turbine engine 100 shown in FIG. 7 has a nacelle 170 and a turbomachine cowl 122 that that are both, at least in part, annularly non-symmetrical about the longitudinal axis 112. In the embodiment depicted, only a portion of the turbomachine cowl 122 proximate the axial position 316 of the gully distance g is annularly non-symmetrical about the longitudinal axis 112. The fan duct inlet 176 is annularly symmetrical about the longitudinal axis 112. However, in other exemplary embodiments, at least a portion of the fan duct 172 aft of the fan duct inlet 176 is annularly non-symmetrical.

As shown in FIG. 7, a trailing edge 171 of the nacelle 170 forms, on an upper end of the gas turbine engine 100 in the radial direction R, a first nacelle angle α1 with respect to the axial direction A, and on a lower end of the gas turbine engine 100 in the radial direction R, a second nacelle angle α2 with respect to the axial direction A. Further, a trailing edge of the turbomachine cowl 122 forms, on an upper end of the gas turbine engine 100 in the radial direction R, a first turbomachine cowl angle β1 with respect to the axial direction A, and on a lower end of the gas turbine engine 100 in the radial direction R, a second turbomachine cowl angle β2 with respect to the axial direction A. In the embodiment depicted, the first nacelle angle α1 is greater than the second nacelle angle α2. More specifically, for the embodiment depicted, the first nacelle angle α1 is greater than the second nacelle angle α2, and the second turbomachine cowl angle β2 is greater than the first turbomachine cowl engine β1. Due to the first nacelle angle α1 and the second turbomachine cowl angle β2 being greater than the second nacelle angle α2 and the first turbomachine cowl angle β1, respectively, the first distance d1 is less than the second distance d2 (see FIG. 3).

Returning to FIG. 7, according to one or more embodiments, the first nacelle angle α1 is between 1.1 and 3 times the second nacelle angle α2. For example, in at least certain exemplary embodiments, the first nacelle angle α1 is between 1.1 and 1.5 times the second nacelle angle α2, between 1.5 and 2.0 times the second nacelle angle α2, between 2.0 and 2.5 times the second nacelle angle α2, or between 2.5 and 3.0 times the second nacelle angle α2.

According to one or more embodiments, the second turbomachine cowl angle β2 is between 1.1 and 3 times the first turbomachine cowl angle β1. For example, in at least certain exemplary embodiments, the second turbomachine cowl angle β2 is between 1.1 and 1.5 times the first nacelle angle β1, between 1.5 and 2.0 times the first turbomachine cowl angle β1, between 2.0 and 2.5 times the first turbomachine cowl angle β1, or between 2.5 and 3.0 times the first turbomachine cowl angle β1.

According to one or more embodiments, the first distance d1 may be between 80% and 99% of second distance d2. For example, in at least certain exemplary embodiments, the first distance d1 may be between 80 and 85% of the second distance d2, between 85% and 90% of the second distance d2, between 90% and 95% of the second distance d2, or between 95% and 99% of the second distance d2.

Figure 8:
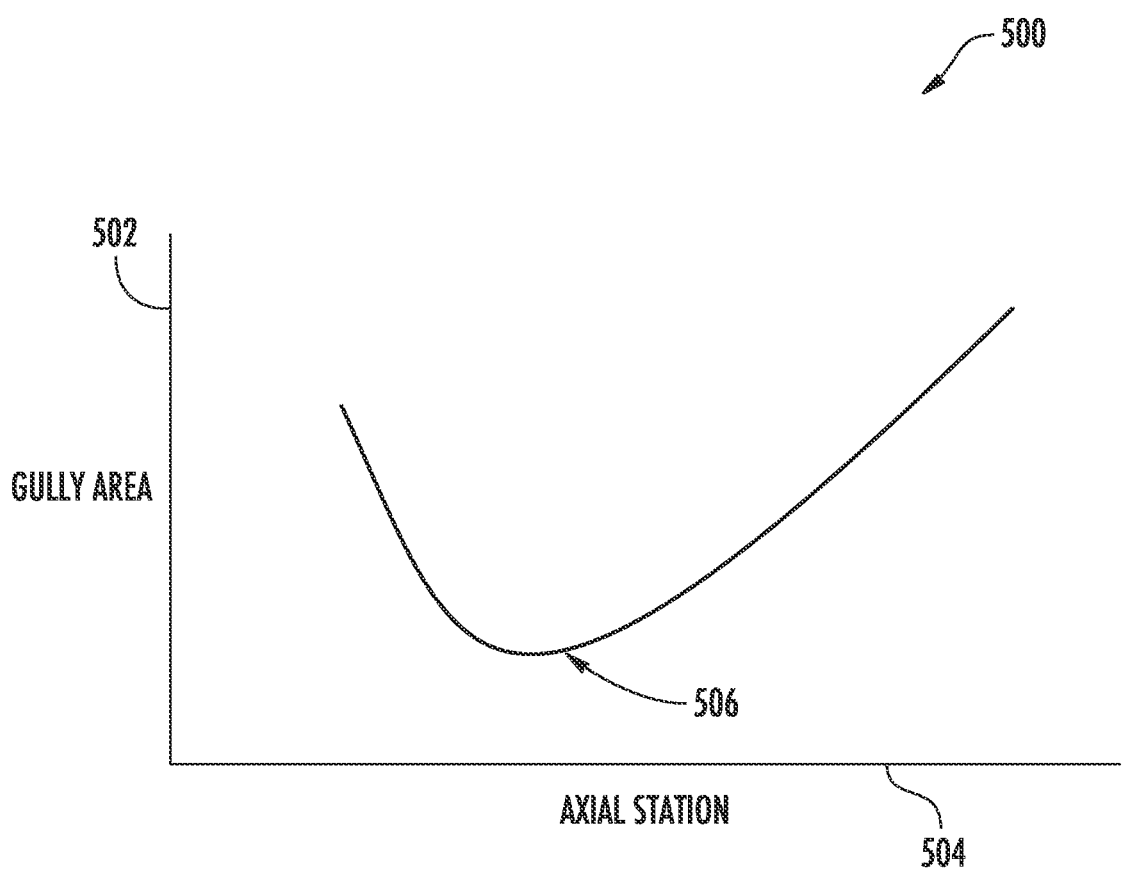
FIG. 8 is a graphical representation of a gully area for a given axial station of a gas turbine engine in accordance with one or more embodiments of the present disclosure.

For a given distance between the longitudinal axis 112 and the lower surface 311 of the wing 310, decreasing the first distance d1 results in an increase in increase d2. Thus, it will be appreciated that, by structuring the gas turbine engine such that the first distance d1 is less than the second distance d2, the gully distance g is increased compared with a conventional gas turbine engine in which the radius of the outer surface is annularly constant. Further, still, referring briefly to the chart 500 of FIG. 8, a graphical representation of gully area for a given axial station of the gas turbine engine is shown. The axial station may generally increase with a direction of flow of the gas turbine engine and may be aligned with an axial direction of the gas turbine engine. The gully area is shown on a y-axis 502, and the axial station is shown on an x-axis 504. A minimum gully area is represented at 506 and may act as a throat area. The axial station of the minimum gully area 506 may align with the cross-sectional views depicted in, e.g., FIGS. 4 and 6. Accordingly, increasing the gully distance g in these embodiments may represent an increase in the minimum gully area represented at 506. The increase in the minimum gully area represented at 506 can reduce an acceleration at a throat of the gully area, in turn reducing a Mach number of an airflow through the gully area. This may result in a reduced drag at a lower surface of a wing, a side surface of a pylon fairing, and an upper surface of the gas turbine engine, reduce the shock at the gully area, and improve efficiency of the aircraft.

One or more of the above structures of the gas turbine engine 100 are applicable to both conventional and counter-rotating open fan configurations. And one or more of the above structures of the gas turbine engine 100 are applicable to pylon fairings that are perpendicular to the wing 310 or perpendicular to the ground.

Further aspects are provided by the subject matter of the following clauses:

A gas turbine engine defining a radial direction, an axial direction, a circumferential direction, and a longitudinal axis, the gas turbine engine comprising: a fan rotatable about the longitudinal axis; a turbomachine; and a housing surrounding the turbomachine and comprising an upper outer surface portion and a lower outer surface portion, the housing defining a first distance extending radially from the longitudinal axis to a first point located at the upper outer surface portion, the housing further defining a second distance extending radially from the longitudinal axis to a second point located at the lower outer surface portion, and the second distance is greater than the first distance The gas turbine engine of the preceding clause, wherein the gas turbine engine defines a reference plane extending perpendicular to the longitudinal axis, wherein the first and second distances are defined in the reference plane The gas turbine engine of any preceding clause, wherein the turbomachine comprises a turbomachine cowl, wherein the turbomachine cowl is located at least in part downstream from the housing.

The gas turbine engine of one or more of the preceding clauses, wherein the turbomachine comprises a turbomachine cowl, wherein the turbomachine cowl is annularly symmetrical about the longitudinal axis.

The gas turbine engine of any preceding clause, wherein the turbomachine comprises a turbomachine cowl, wherein a trailing edge of the housing defines, at an upper portion of the gas turbine engine, a first nacelle angle with respect to the axial direction, and at a lower portion of the gas turbine engine, a second nacelle angle with respect to the axial direction, wherein a trailing edge of the turbomachine cowl defines, at the upper portion of the gas turbine engine, a first turbomachine cowl angle with respect to the axial direction, and at the lower portion of the gas turbine engine, a second turbomachine cowl angle with respect to the axial direction, and wherein the second nacelle angle is different than the first nacelle angle, and the second turbomachine cowl angle is different than the first turbomachine cowl angle.

The gas turbine engine of any preceding clause, wherein the turbomachine comprises a turbomachine cowl, wherein a trailing edge of the housing defines, at an upper portion of the gas turbine engine, a first nacelle angle with respect to the axial direction, and at a lower portion of the gas turbine engine, a second nacelle angle with respect to the axial direction, wherein a trailing edge of the turbomachine cowl defines, at the upper portion of the gas turbine engine, a first turbomachine cowl angle with respect to the axial direction, and at the lower portion of the gas turbine engine, a second turbomachine cowl angle with respect to the axial direction, and wherein the second nacelle angle is greater than the first nacelle angle, and the second turbomachine cowl angle is greater than the first turbomachine cowl angle.

The gas turbine engine of any preceding clause, wherein the turbomachine comprises a turbomachine cowl, wherein the gas turbine engine defines a third stream flowpath extending between the housing and the turbomachine cowl.

The gas turbine engine of any preceding clause, wherein the first and second distances are defined at an axial position, and wherein, at the axial position, the third stream flowpath of the gas turbine engine narrows from a lower portion of the gas turbine engine in the radial direction to an upper portion of the gas turbine engine.

The gas turbine engine of any preceding clause, wherein the first and second distances are defined at an axial position, and wherein the housing comprises, at the axial position, a flat section that is flat within the reference plane.

The gas turbine engine of any preceding clause, wherein the flat section forms an acute angle with the radial direction.

The gas turbine engine of any preceding clause, wherein the housing further includes a curved section immediate adjacent to a pylon fairing.

The gas turbine engine of any preceding clause, wherein the housing further includes a curved section and a symmetrical section, wherein the flat section is positioned between the curved section and the symmetrical section.

The gas turbine engine of any preceding clause, wherein the curved section is within the reference plane.

The gas turbine engine of any preceding clause, wherein the symmetrical section is within the reference plane.

An aircraft engine assembly comprising: a wing; a pylon fairing; and a gas turbine engine attached to the wing, the wing, the gas turbine engine, and the pylon fairing together defining in part a gully area, the gas turbine engine defining a radial direction, an axial direction, a circumferential direction, and a longitudinal axis, the gas turbine engine comprising: a fan rotatable about the longitudinal axis; a turbomachine; and a housing surrounding the turbomachine and comprising an outer surface, the housing defining a first distance between the longitudinal axis and a first point on the outer surface of the housing, the housing further defining a second distance between the longitudinal axis and a second point on the outer surface of the housing, the first point closer to the gully area than the second point, the first distance and the second distance defined in a reference plane extending perpendicular to the longitudinal axis, and the second distance being greater than the first distance.

The aircraft engine assembly of any preceding clause, wherein the fan is an unducted fan, and wherein the gully area is disposed downstream of the fan.

The aircraft engine assembly of any preceding clause, wherein the first and second distances are defined at an axial position, and wherein the axial position is defined at an axial location having a minimum distance in the radial direction between the wing and the gas turbine engine.

The aircraft engine assembly of any preceding clause, wherein the turbomachine comprises a turbomachine cowl.

The aircraft engine assembly of any preceding clause, wherein the turbomachine cowl is annularly symmetrical about the longitudinal axis.

The aircraft engine assembly of any preceding clause, wherein a trailing edge of the housing defines, at an upper portion of the gas turbine engine, a first nacelle angle with respect to the axial direction, and at a lower portion of the gas turbine engine, a second nacelle angle with respect to the axial direction, wherein a trailing edge of the turbomachine cowl defines, at the upper portion of the gas turbine engine, a first turbomachine cowl angle with respect to the axial direction, and at the lower portion of the gas turbine engine, a second turbomachine cowl angle with respect to the axial direction, and wherein the second nacelle angle is greater than the first nacelle angle, and the second turbomachine cowl angle is greater than the first turbomachine cowl angle.

The aircraft engine assembly of any preceding clause, wherein the gas turbine engine defines a third stream flowpath extending between the housing and the turbomachine cowl.

The aircraft engine assembly of any preceding clause, wherein the first and second distances are defined at an axial position, and wherein, at the axial position, the third stream flowpath of the gas turbine engine narrows from a lower portion of the gas turbine engine in the radial direction to an upper portion of the gas turbine engine.

The aircraft engine assembly of any preceding clause, wherein the first and second distances are defined at an axial position, and wherein the housing comprises, at the axial position, a flat section that is flat within a plane perpendicular to the axial direction.

The aircraft engine assembly of any preceding clause, wherein the flat section forms an acute angle with the radial direction.

The aircraft engine assembly of any preceding clause, wherein the first point is on the outer surface of the housing on an upper half of the gas turbine engine in the radial direction, and wherein the second point is on the outer surface of the housing on a lower half of the gas turbine engine in the radial direction This written description uses examples to disclose the present disclosure, including the best mode, and also to enable any person skilled in the art to practice the disclosure, including making and using any devices or systems and performing any incorporated methods. The patentable scope of the disclosure is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

We claim:

1. A gas turbine engine defining a radial direction, an axial direction, a circumferential direction, and a longitudinal axis, the gas turbine engine attachable to a wing via a pylon fairing and a gully distance defined between the wing and the gas turbine engine, the gas turbine engine comprising:
   a fan rotatable about the longitudinal axis, wherein the fan is an unducted fan having fan blades rotatable about the longitudinal axis and fan guide vanes not rotatable about the longitudinal axis;
   a turbomachine; and
   a housing surrounding the turbomachine and comprising an upper outer surface portion and a lower outer surface portion,
   at a corresponding axial position of the gully distance, the housing defining a first distance extending radially from the longitudinal axis to a first point located at the upper outer surface portion,
   at the corresponding axial position of the gully distance, the housing further defining a second distance extending radially from the longitudinal axis to a second point located at the lower outer surface portion, and
   the second distance is greater than the first distance,
   wherein the gas turbine engine includes a fan exhaust nozzle that has a first width along the first distance and a second width along the second distance, wherein the second width is greater than the first width; wherein the first point, the second point, and the gully distance are collinear with an exit plane of the fan exhaust nozzle;

and wherein the gully distance is defined between a wing surface below a leading edge of the wing and the gas turbine engine.

2. The gas turbine engine of claim 1, wherein the turbomachine comprises a turbomachine cowl, wherein the turbomachine cowl is located at least in part downstream from the housing, and wherein the gully distance is a minimum distance defined between a lower surface of the wing and the upper outer surface portion of the housing directly adjacent to the pylon fairing.

3. The gas turbine engine of claim 1, wherein the turbomachine comprises a turbomachine cowl, wherein the turbomachine cowl is annularly symmetrical about the longitudinal axis.

4. The gas turbine engine of claim 1,
wherein the turbomachine comprises a turbomachine cowl,
wherein a trailing edge of the housing defines, at an upper portion of the gas turbine engine, a first housing angle with respect to the axial direction, and at a lower portion of the gas turbine engine, a second housing angle with respect to the axial direction,
wherein a trailing edge of the turbomachine cowl defines, at the upper portion of the gas turbine engine, a first turbomachine cowl angle with respect to the axial direction, and at the lower portion of the gas turbine engine, a second turbomachine cowl angle with respect to the axial direction, and
wherein the second housing angle is different than the first housing angle, and the second turbomachine cowl angle is different than the first turbomachine cowl angle.

5. The gas turbine engine of claim 1, wherein the turbomachine comprises a turbomachine cowl, and wherein the gas turbine engine defines a third stream flowpath extending between the housing and the turbomachine cowl.

6. The gas turbine engine of claim 5, wherein the first and second distances are defined at an axial position, and wherein, at the axial position, the third stream flowpath of the gas turbine engine narrows from a lower portion of the gas turbine engine in the radial direction to an upper portion of the gas turbine engine.

7. The gas turbine engine of claim 1, wherein the gas turbine engine defines a reference plane extending perpendicular to the longitudinal axis, wherein the first and second distances are defined in the reference plane.

8. The gas turbine engine of claim 7, wherein the first and second distances are defined at an axial position, and wherein the housing comprises, at the axial position, a flat section that is flat within the reference plane.

9. The gas turbine engine of claim 8, wherein the flat section forms an acute angle with the radial direction.

10. An aircraft engine assembly comprising:
a wing;
a pylon fairing; and
a gas turbine engine attached to the wing via the pylon fairing and a gully distance defined between the wing and the gas turbine engine, wherein the wing, the gas turbine engine, and the pylon fairing together defining in part a gully area, the gas turbine engine defining a radial direction, an axial direction, a circumferential direction, and a longitudinal axis, the gas turbine engine comprising:
a fan rotatable about the longitudinal axis, wherein the fan is an unducted fan having fan blades rotatable about the longitudinal axis and fan guide vanes not rotatable about the longitudinal axis;
a turbomachine; and
a housing surrounding the turbomachine and comprising an outer surface,
at a corresponding axial position of the gully distance, the housing defining a first distance between the longitudinal axis and a first point on the outer surface of the housing,
at the corresponding axial position of the gully distance, the housing further defining a second distance between the longitudinal axis and a second point on the outer surface of the housing, the first point closer to the gully area than the second point, the first distance and the second distance defined in a reference plane extending perpendicular to the longitudinal axis, and the second distance being greater than the first distance,
wherein the gas turbine engine includes a fan exhaust nozzle that has a first width along the first distance and a second width along the second distance, wherein the second width is greater than the first width; wherein the first point, the second point, and the gully distance are collinear with an exit plane of the fan exhaust nozzle; and wherein the gully distance is defined between a wing surface below a leading edge of the wing and the gas turbine engine.

11. The aircraft engine assembly according to claim 10, wherein the gully area is disposed downstream of the fan, and wherein the gully distance is a minimum distance defined between a lower surface of the wing and the outer surface of the housing directly adjacent to the pylon fairing.

12. The aircraft engine assembly according to claim 10, wherein the first and second distances are defined at an axial position, and wherein the axial position is defined at an axial location having a minimum distance in the radial direction between the wing and the gas turbine engine.

13. The aircraft engine assembly of claim 10, wherein the turbomachine comprises a turbomachine cowl.

14. The aircraft engine assembly of claim 13, wherein the turbomachine cowl is annularly symmetrical about the longitudinal axis.

15. The aircraft engine assembly of claim 13,
wherein a trailing edge of the housing defines, at an upper portion of the gas turbine engine, a first housing angle with respect to the axial direction, and at a lower portion of the gas turbine engine, a second housing angle with respect to the axial direction,
wherein a trailing edge of the turbomachine cowl defines, at the upper portion of the gas turbine engine, a first turbomachine cowl angle with respect to the axial direction, and at the lower portion of the gas turbine engine, a second turbomachine cowl angle with respect to the axial direction, and
wherein the second housing angle is greater than the first housing angle, and the second turbomachine cowl angle is greater than the first turbomachine cowl angle.

16. The aircraft engine assembly of claim 13, wherein the gas turbine engine defines a third stream flowpath extending between the housing and the turbomachine cowl.

17. The aircraft engine assembly of claim 16, wherein the first and second distances are defined at an axial position, and wherein, at the axial position, the third stream flowpath of the gas turbine engine narrows from a lower portion of the gas turbine engine in the radial direction to an upper portion of the gas turbine engine.

18. The aircraft engine assembly of claim 10, wherein the first and second distances are defined at an axial position, and wherein the housing comprises, at the axial position, a flat section that is flat within a plane perpendicular to the axial direction.

19. The aircraft engine assembly of claim 18, wherein the flat section forms an acute angle with the radial direction.

20. The aircraft engine assembly of claim 10, wherein the first point is on the outer surface of the housing on an upper half of the gas turbine engine in the radial direction, and wherein the second point is on the outer surface of the housing on a lower half of the gas turbine engine in the radial direction.

* * * * *